United States Patent
Lee et al.

(10) Patent No.: US 7,426,237 B2
(45) Date of Patent: Sep. 16, 2008

(54) ALGORITHM FOR DECREASING THE NUMBER OF UNNECESSARY CHECKPOINTS IN THE CELLULAR SEARCH

(75) Inventors: Jiann-Der Lee, Tao-Yuan (TW); Su-Yen Wang, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 851 days.

(21) Appl. No.: 10/863,025

(22) Filed: Jun. 8, 2004

(65) Prior Publication Data

US 2005/0271143 A1     Dec. 8, 2005

(51) Int. Cl.
*H04N 7/12* (2006.01)
*G06K 9/36* (2006.01)
(52) U.S. Cl. .................................. 375/240.16; 382/236
(58) Field of Classification Search ............ 375/240.16, 375/240.17, 240.24; 382/236
See application file for complete search history.

(56) References Cited

U.S. PATENT DOCUMENTS

| | | | |
|---|---|---|---|
| 2002/0015513 A1* | 2/2002 | Ando et al. ................. | 382/107 |
| 2004/0081238 A1* | 4/2004 | Parhy ..................... | 375/240.16 |
| 2004/0146108 A1* | 7/2004 | Hsia ....................... | 375/240.16 |

* cited by examiner

*Primary Examiner*—Gims S Philippe
(74) *Attorney, Agent, or Firm*—Alan Kamrath; Kamrath & Associates PA

(57) ABSTRACT

An algorithm for decreasing the number of unnecessary checkpoints in the cellular search includes first and second search ways of each of the processes. All the first search ways are the same, and the second search ways are classified to different search modes by an algorithm. The first search ways and the second search ways are continually consecutively actuated and stopped when obtaining a broken condition or finding a best block-matching, and a best motion vector is obtained.

2 Claims, 9 Drawing Sheets

Table 1: In PSNR

| Image | Algorithms | | |
|---|---|---|---|
| | TSS | CS | FCS |
| Salesman | 32.51249 | 35.0758 | 34.7929 |
| Football | 22.36790 | 22.3336 | 21.6525 |
| Susigirl | 33.10686 | 34.4879 | 33.4642 |

Table 2: In MSE

| Image | Algorithms | | |
|---|---|---|---|
| | TSS | CS | FCS |
| Salesman | 40.10971 | 20.6966 | 22.1700 |
| Football | 379.66093 | 383.5360 | 435.8387 |
| Susigirl | 40.36208 | 26.7168 | 34.3694 |

Table 3: In Average Points

| Image | Algorithms | | |
|---|---|---|---|
| | TSS | CS | FCS |
| Salesman | 23.51260 | 15.8312 | 8.4795 |
| Football | 23.56587 | 22.3453 | 10.1755 |
| Susigirl | 23.32571 | 17.9404 | 9.6930 |

FIG. 9

ALGORITHM FOR DECREASING THE NUMBER OF UNNECESSARY CHECKPOINTS IN THE CELLULAR SEARCH

BACKGROUND OF THE INVENTION

1. Field of the Invention

The present invention relates to an algorithm in the cellular search (CS) and more particularly to an algorithm for decreasing the number of unnecessary checkpoints in the cellular search.

2. Description of Related Art

In video coding systems, motion estimation plays a key role to remove temporal correlation between video pictures allowing information compression at reasonable video quality. At the same time, motion estimation is a very critical module of the encoder since it consumes most of the available computing time. Therefore, a fast and accurate block-based search technique is highly desirable to assure much reduced process delay while maintaining good reconstructed image quality. A straightforward block-matching algorithm (BMA) is the full-search (FS), which exhaustively searches for the accurate motion vector. The algorithm searches all locations in a specific search range and selects the position where the residual error of block-matching is minimized. Although it is optimal, such an approach results in a high computational cost due to the high number operations that are involved, and it is not suitable for real time and low power applications. To overcome this drawback, many fast block-matching algorithms have been developed, such as 2-D logarithm search (LOGS), three-step search (TSS), cellular search (CS), fast three-step search (FTSS), four-step search (4SS), and diamond search (DS), etc. The cellular search (CS) is an efficient one in fast computation while keeping reasonable picture performance.

The present invention has arisen to mitigate and/or obviate the disadvantages of the conventional algorithms.

SUMMARY OF THE INVENTION

The main objective of the present invention is to provide an improved algorithm that decreases the number of unnecessary checkpoints in the cellular search.

To achieve the objective, the algorithm in accordance with the present invention comprises first and second search ways of each of the processes of the present invention. All the first search ways are the same, and the second search ways are classified to different search modes by the algorithm. The first search ways and the second search ways are continually consecutively actuated and stopped when obtaining a broken condition or finding a best block-matching, and a best motion vector is obtained.

Further benefits and advantages of the present invention will become apparent after a careful reading of the detailed description with appropriate reference to the accompanying drawings.

BRIEF DESCRIPTION OF THE DRAWINGS

FIG. 9 is a comparison list of the algorithm of the present invention and the conventional algorithm.

DETAILED DESCRIPTION OF THE INVENTION

Figure 1:
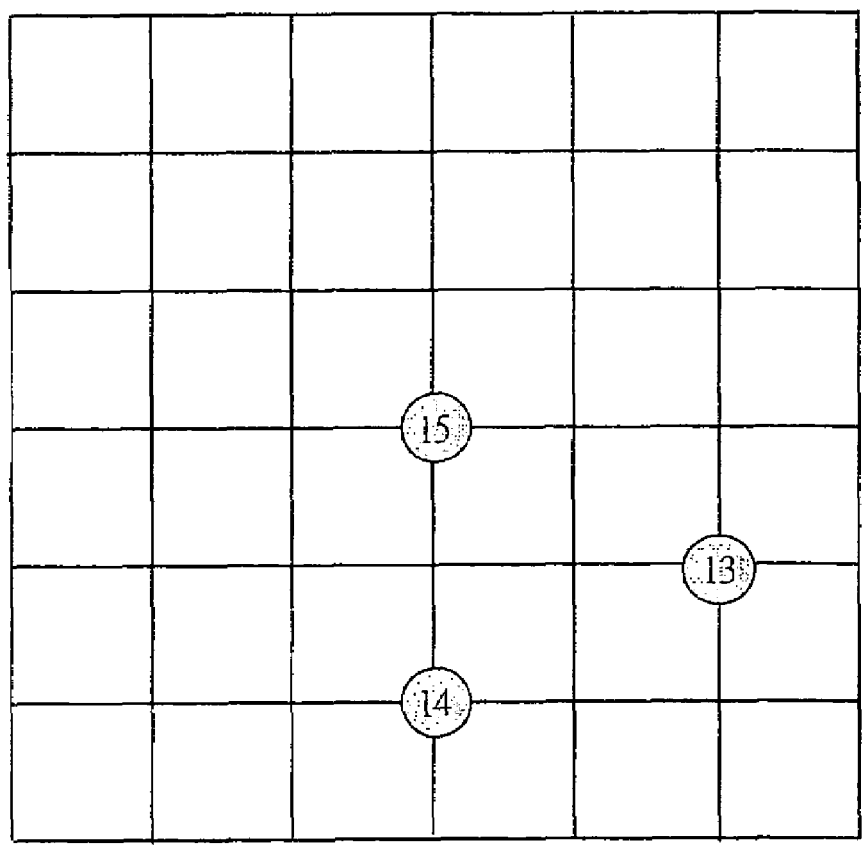
FIG. 1 shows an original step of an algorithm for decreasing the number of unnecessary checkpoints in the cellular search in accordance with the present invention.

Referring to the drawings and initially to FIG.1, an algorithm for decreasing the number of unnecessary checkpoints in the cellular search in accordance with the present invention comprises first and second search ways of each of the processes of the present invention. All the first search ways are the same, and the second search ways are classified to different search modes by algorithm. The first search ways and the second search ways are continually consecutively actuated, and stopped when obtaining a broken condition or finding a best block-matching, and a best vector is obtained. The broken condition is established when the mean absolute distance (MAD) between the slated block and the current block is zero. The searching process of the slated block is stopped in advance, outputs a best motion vector of the slated block and searches the next current block. Consequently, using the broken condition can effectively reduce the number of blocks that needs to be searched, and, thus, the computation is reduced. The algorithm of the present invention is especially effective when being used on slow motion pictures. The MAD can be adjusted due to the characteristics of the videos.

The algorithm of the present invention includes the following steps.

STEP 1

The position of the current block is set as a center of a searching region and has a coordinate (0, 0). According to the result of statistics, most of the video images have a motion vector that is near the origin of the coordinates. Consequently, for calculating the motion vector by CS, the position of the motion vector can be more quickly found from the center than that from the periphery. For the beginning, three possible slated blocks (13, 14, 15) in a 5×5 search window are compared, and the MADs thereof are calculated. The position of the slated block relative to the current block is recorded, and the difference and the motion vector are output when the MAD is zero. Otherwise, step 2 is actuated.

STEP 2

Figure 7:
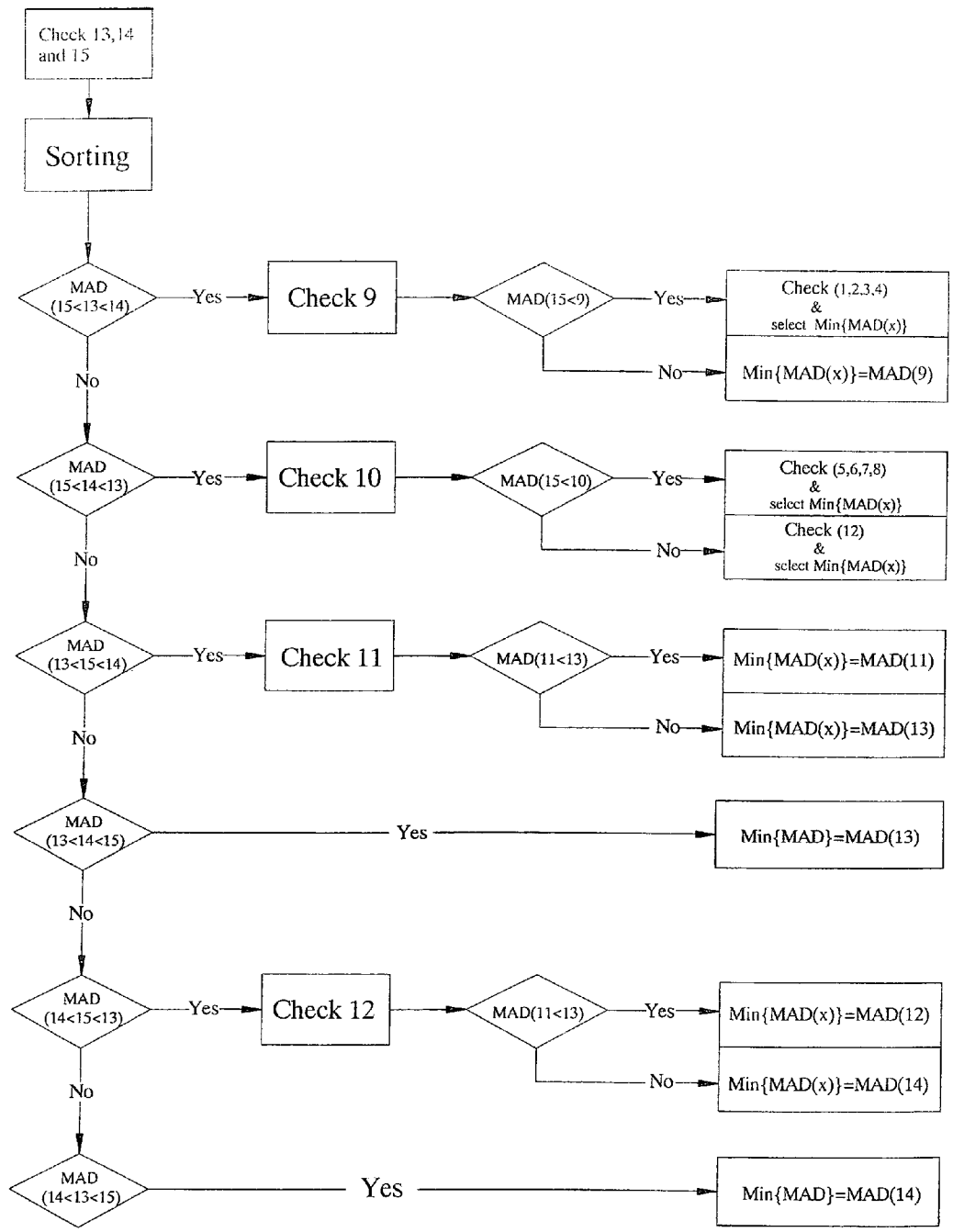
FIG. 7 is a flow chart of the algorithm of the present invention.
Figure 8:
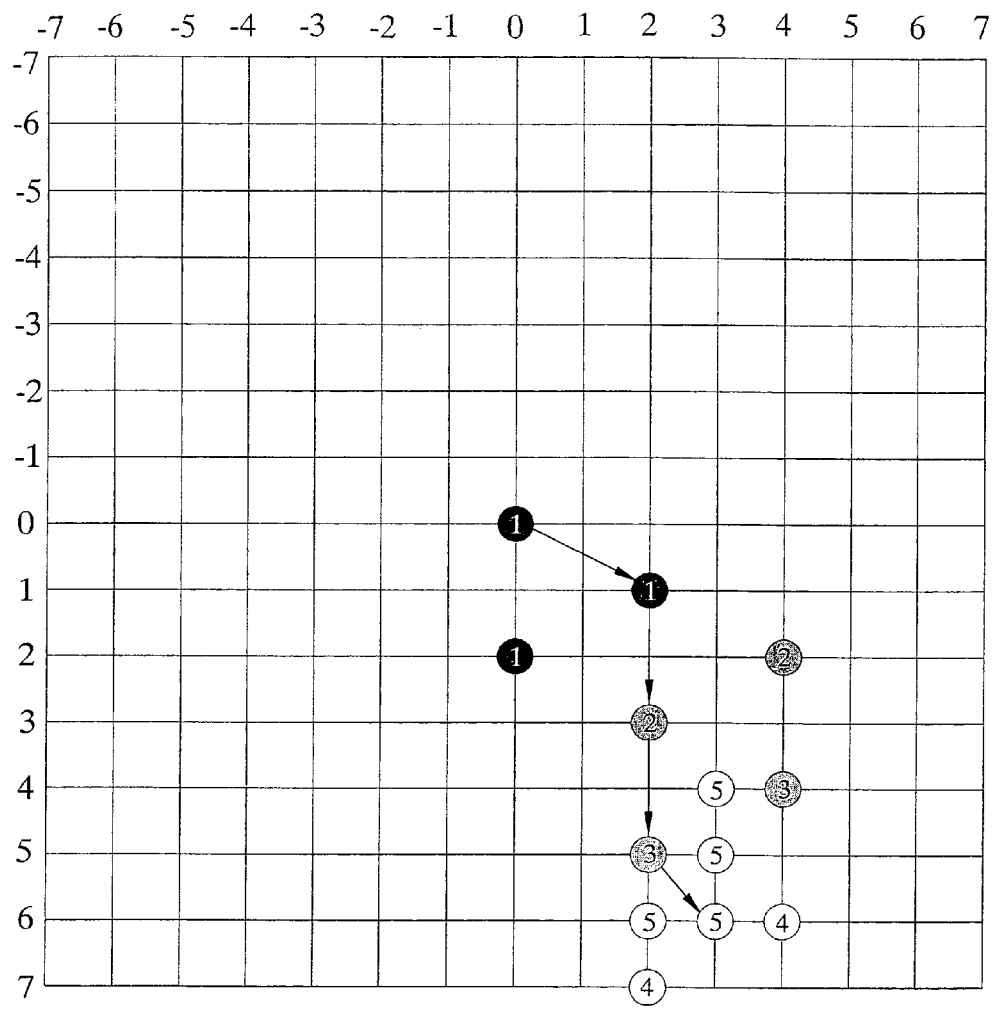
FIG. 8 is a processing chart of the algorithm of the present invention.

The MADs of the above three slated blocks (13, 14, 15) are calculated and arranged after finishing the step 1, and a searching mode of the three slated blocks via the pseudo codes of the three slated blocks is selected. The comparison processes are shown in FIG. 7.

Figure 2:
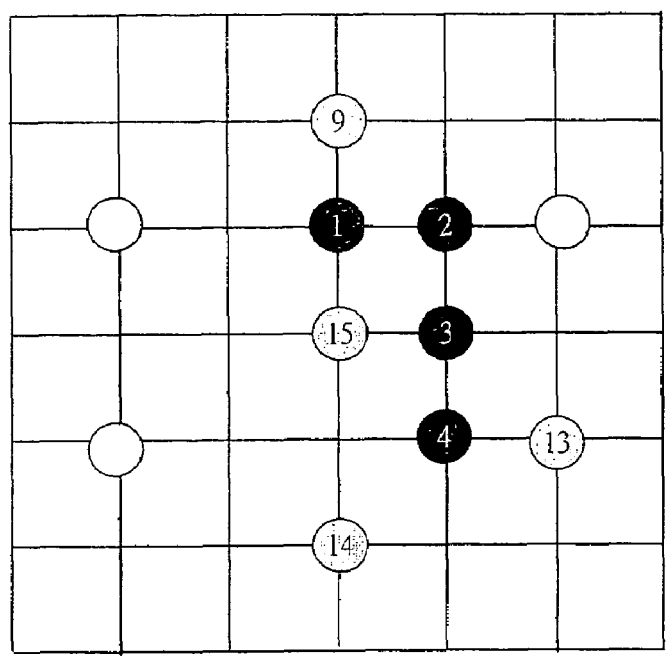
FIG. 2 shows a case 1 of the comparison processes of the present invention.

Case 1, with reference to FIG. 2:

If MAD (15) < MAD (13) < MAD (14)
If MAD (15)=0 break end
If MAD (15) < MAD (9)
If MAD (9)=0 break end
then check 1, 2, 3, 4 & select min{MAD(x)}
If MAD (1)=0 break end -continued

```
If MAD (2)=0 break end
If MAD (3)=0 break end
If MAD (4)=0 break end
else min{MAD(x)}=MAD (9)
end
end
End
```

Figure 3:
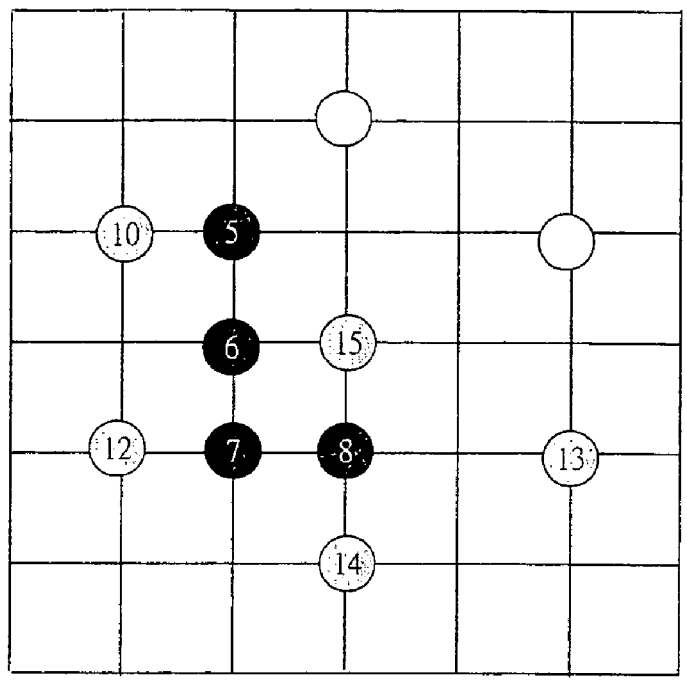
FIG. 3 shows a case 2 of the comparison processes of the present invention.

CASE 2, with reference to FIG. 3:

```
If MAD (15) < MAD (14) <MAD (13)
If MAD (15)=0 break end
If MAD (15) <MAD (10)
If MAD (10)=0 break end
then check 5, 6, 7, 8 & select min{MAD(x)}
If MAD (5)=0 break end
If MAD (6)=0 break end
If MAD (7)=0 break end
If MAD (8)=0 break end
else check 12 & select min{MAD(x)}
end
End
```

Figure 4:
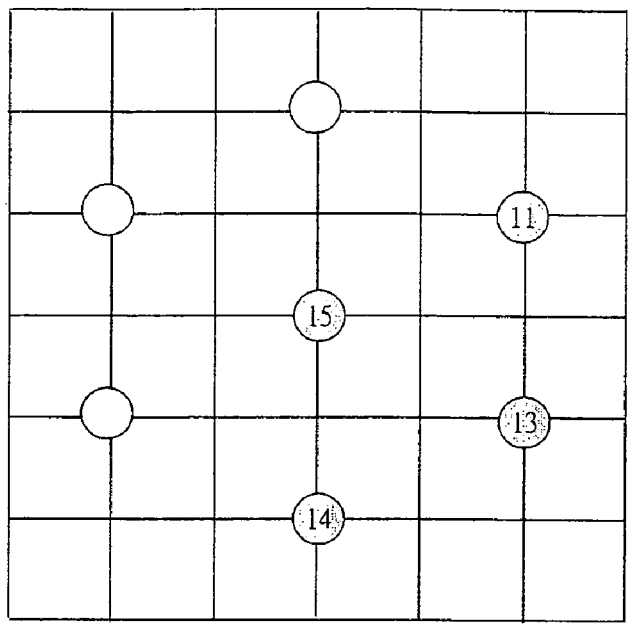
FIG. 4 shows a case 3 of the comparison processes of the present invention.

CASE 3, with reference to FIG. 4:

```
If MAD (13) < MAD (15) < MAD (14)
If MAD (13)=0 break end
If MAD (11) < MAD (13)
If MAD (11)=0 break end
then min{MAD(x)}=MAD (11)
else min{MAD(x)}=MAD (13)
end
End
```

CASE 4

```
If MAD (13) < MAD (14) < MAD (15)
min{MAD(x)}=MAD (13)
End
```

Figure 5:
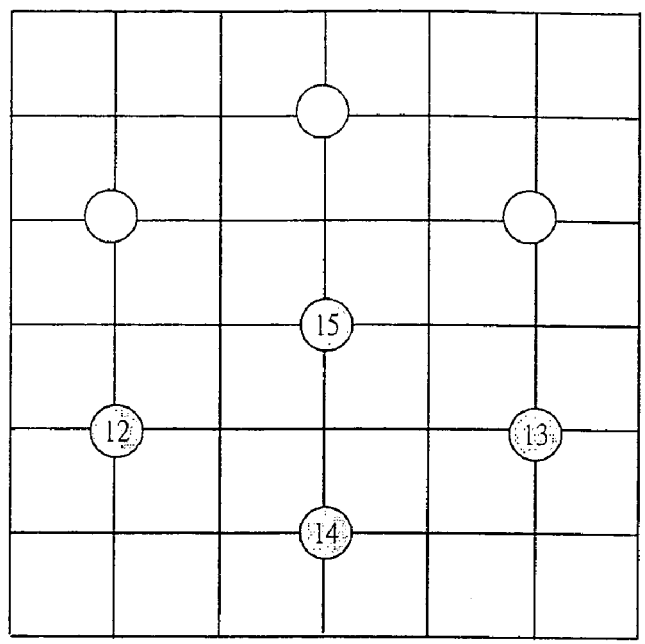
FIG. 5 shows a case 5 of the comparison processes of the present invention.
Figure 6:
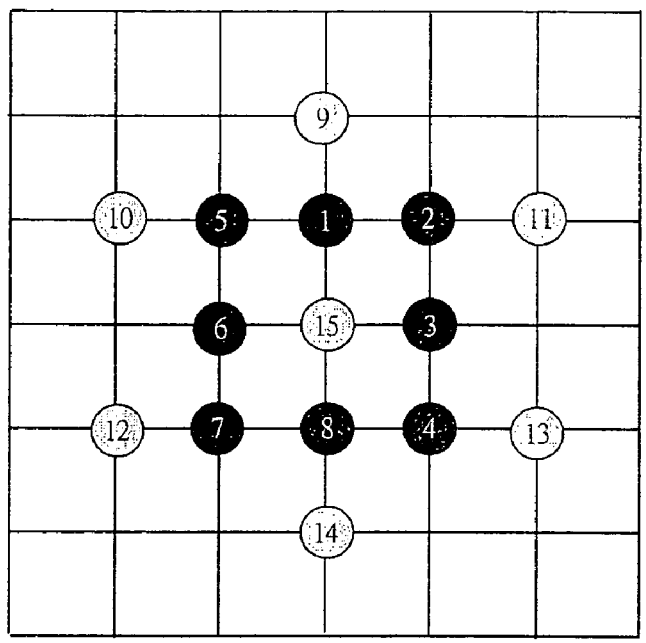
FIG. 6 shows fifteen checkpoints of the algorithm of the present invention.

CASE 5, with reference to FIG. 5:

```
If MAD (14) < MAD (15) < MAD (13)
If MAD (14)=0 break end
If MAD (12) < MAD (14)
If MAD (12)=0 break end
then min{MAD(x)}=MAD (12)
else min{MAD(x)}=MAD (14)
end
End
```

CASE 6

```
If MAD (14) < MAD (13) < MAD (15)
min{MAD(x)}=MAD (14)
End
```

The algorithm of the present invention locates a specific search range and selects the position where the residual error of the block matching is minimized. Consequently, the algorithm contains the modes and the characteristics of all the conventional algorithm searches. The slated blocks of the large cellular search pattern (LCSP) are effectively reduced by comparing the three original slated blocks. The LCSP mode is changed into a small cellular search pattern (SCSP) mode for searching eight slated blocks when using the LCSP mode, and the MAD is found on the center point. The algorithm of the present invention has a mode similar to that of CS. When processing the present invention and the MAD is found on the center point, the blocks surrounding the center point will be searched. However, the number of the slated blocks is reduced from eight to four. Consequently, the processing time of the present invention is faster than that of the conventional algorithms.

The video quality must be considered in the algorithm. The conventional algorithms usually use peak signal to noise ratio (PSNR) to estimate the video quality, as shown in the following formula:

$$PSNR = 10 \log_{10} \frac{255 \times 255}{\frac{1}{N \times N} \sum_{x=1}^{N} \sum_{y=1}^{N} |f(x, y) - f'(x, y)|^2},$$

wherein the $f(x,y)$ is the original picture.

In the following experiment, three standard videos (salesman, football and susigirl) are selected, wherein the moving object in each of the above videos has a moving speed. The football video is the first, the susigirl is the second and the salesman is the third relative to the moving speed of the moving object therein. Each standard video contains fifty pictures each with a size: 352×288 pixels, grayscale: 8 bits, searching scope: −7 to +7 and a block size: 16×16 pixels. The MAD is used to judge if the minimized distortion block is found or not, and the effects of the CS and TSS is compared.

With reference to FIG. 9, table 1 to table 3, the performance evaluation items include MSE (mean square error), PSNR and Average Points.

In PSNR: the performance of the algorithm of the present invention is similar to the CS in the Salesman video and the Sugigirl video, and better than that of the TSS. However, in the Football video, the video quality of the TSS is better than that of the present invention and the CS.

In MSE: in Football video, the performance of the TSS is lower than that of the CS and the present invention. In the salesman video and the Susigirl video, the effects of the present invention and the CS are similar to each other and within an acceptable scope.

In the Average Points: the present invention reduces the number of the checkpoints of the CS about 50%, and, thus, the algorithm has a low computation rate.

Although the invention has been explained in relation to its preferred embodiment, it is to be understood that many other possible modifications and variations can be made without departing from the spirit and scope of the invention as hereinafter claimed.

What is claimed is:

1. A method for finding block-matching in a cellular search comprising:
    selecting three original slated areas in the searching scope;
    finding a searching slated area by comparing the three original slated areas, with finding the searching slated area using an algorithm for decreasing the number of checkpoints comprising first and second search ways of each process of the algorithm, all the first search ways being the same and the second search ways being classified to different search modes by the algorithm, with the first search ways and the second search ways being continually consecutively actuated and stopped when obtaining a broken condition or when finding a best block-matching, with a last motion vector being obtained by comparing the three original slated areas, with six cases being used in the second search ways and selected due to the three original slated areas; and searching for block-matching to decide the last motion vector, the searching slated area having a center used to continually actuate the first and second search ways and stopped when obtaining the broken condition or finding the best block-matching, and outputting the last motion vector.

2. The method as claimed in claim 1, wherein the broken condition is established when a mean absolute distance (MAD) is zero.

* * * * *